March 11, 1941.  F. AMIOT  2,234,393
DEVICE FOR THE FILLING OF TANKS
Filed Nov. 5, 1938
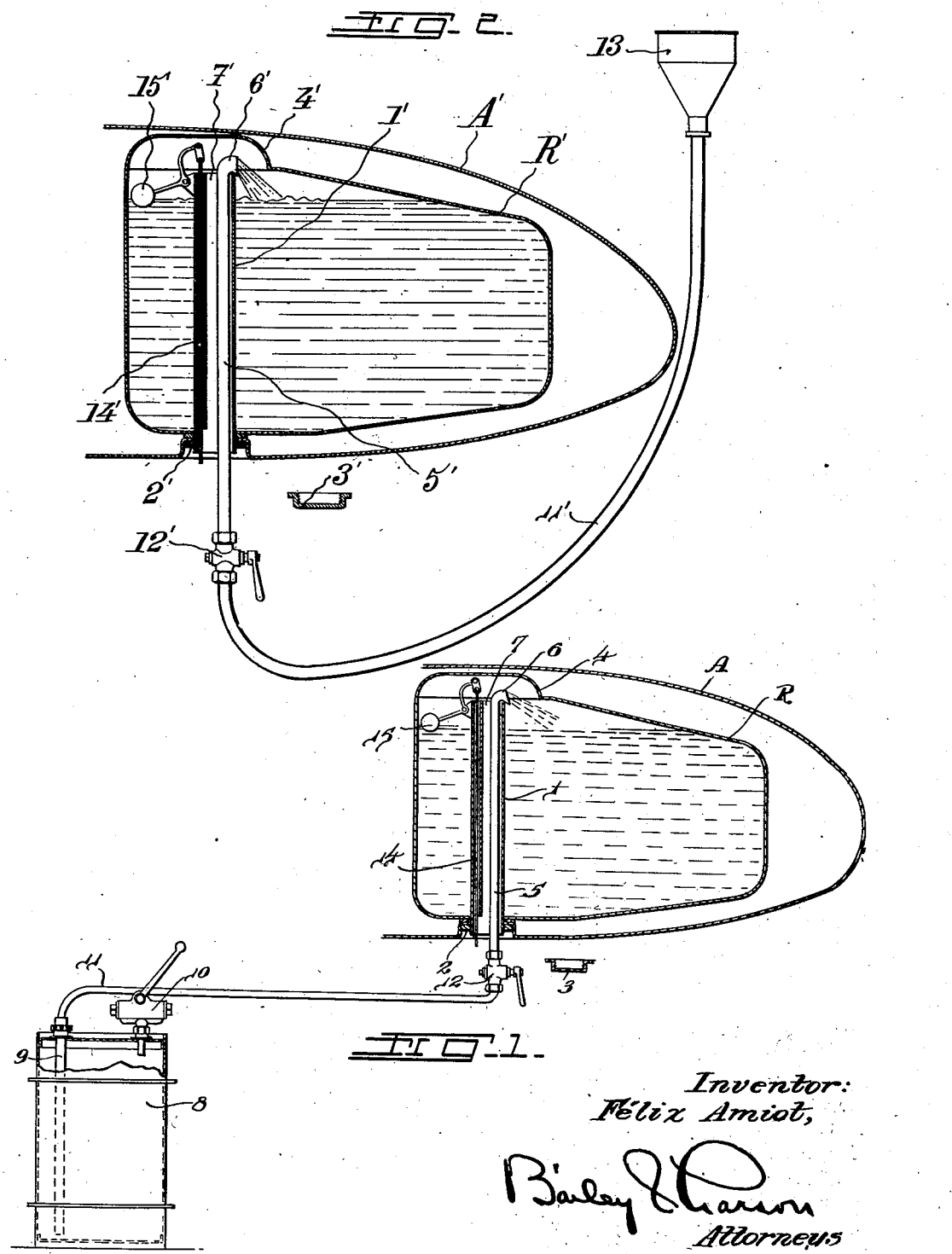
Inventor:
Félix Amiot,
Attorneys Patented Mar. 11, 1941

2,234,393

UNITED STATES PATENT OFFICE 2,234,393

DEVICE FOR THE FILLING OF TANKS

Félix Amiot, Neuilly-sur-Seine, France

Application November 5, 1938, Serial No. 239,166
In Luxemburg October 15, 1938

13 Claims. (Cl. 244—135)

The present invention relates to devices for the filling of tanks such as those which are housed inside a casing or the like, and it is more especially, although not exclusively, concerned with devices of this kind to be used for the filling of gasoline or other fuel tanks to be housed in the body of an automobile vehicle, or in the structure, and in particular the wings, of an aircraft.

The chief object of the present invention is to provide a device of the type above referred to which is better adapted to meet the requirements of practice than the devices used for the same purpose up to the present time, and in particular a device which obviates or eliminates the undesirable effects resulting from liquid leakage at the time of filling of the tank.

According to the essential feature of the present invention, the device in question is arranged in such manner that any leakage as might occur during the filling of the tank is caused to flow directly to the outside of the casing which surrounds the tank so that there is no possibility that the liquid will remain in said casing.

Other features of the present invention will result from the following detailed description of a specific embodiment thereof.

A preferred embodiment of the present invention will be hereinafter described, with reference to the accompanying drawing, given merely by way of example, and in which:

Fig. 1 is a diagrammatic elevational section of the whole of an airplane wing, with a fuel tank housed in said wing, and a device for the filling of said tank, said means being made according to the present invention.

Fig. 2 is a view similar to Fig. 1 but showing a modification.

The following description will refer more specifically to the case of a fuel tank, for instance a gasoline tank, to be housed in the wing of an airplane and to the means for ensuring a satisfactory filling of said tank.

According to the present invention, these means are arranged in such manner that the matter that might leak out close to the filling orifice of a tank, during the introduction of the fuel into said tank, is always compelled to flow directly toward the outside of the wing, in such manner that the matter that has thus leaked out cannot remain inside the wing structure.

As a matter of fact, it has been ascertained that some airplane accidents, for instance in cases of explosion of the airplane while in flight, were due to the presence of fuel on the inside of the wings, this fuel resulting from the filling operation. According to the methods employed up to the present time, the filling operation consisted in introducing a feeder tube or the like into an orifice provided at the upper part of the tank. With such a method, any false move in the course of this operation only causes fuel to run along the walls of the tank, and thence into the wing.

The present invention is intended to remedy this very serious danger.

One skilled in the art may resort to any one of many specific means in practicing the invention after the teachings of this application.

In one embodiment, without having to change the usual arrangement of a filling orifice located at the upper part of the tank under a movable wall element of the wing upper side, I arrange, around the nozzle or the like which carries said orifice and in the interval between the tank and the wing upper side, a partition forming a funnel or collector intended to collect any liquid as may have leaked out during the filling operation, for instance when, upon a false move, the feeder tube is caused to feed liquid without being engaged in said orifice. This collector would be fitted with an outlet conduit which, flowing through or around the tank, would be capable of immediately and directly discharging the liquid onto the ground, this outlet conduit either passing through the wing under side or leading to an orifice provided in said under side.

According to the preferred embodiments of the invention, I have found that it is more advantageous to have recourse to another arrangement in which, instead of introducing the feeder tube into the tank from above, it is introduced from below (or possibly from a lateral direction) for instance through a conduit extending through the tank and which opens into the upper part thereof.

The system is arranged in such manner that, once the feeder tube is introduced, in the course of the filling operation, into said conduit, and arranged or positioned in such manner as to be able to feed liquid into the tank, any leakage of liquid as might take place flows immediately and through said conduit onto the ground, without any possibility of said liquid being poured into the inside of the wing.

With arrangements of this kind, the conduit, designated by reference character I in Fig. 1 of the drawings, is made as follows:

It is preferably of a rectilinear shape, being in the present instance vertical.

Furthermore, this conduit I is mounted in such manner on tank R and on wing A that there is no possibility of flow of liquid into the inside of the wing. For this purpose, said conduit opens, at the bottom thereof and after its passage through the tank, into a coupling piece 2, mounted in a fluid tight manner in the wing under side and normally closed by a fluid tight plug 3.

Preferably, in order to allow the top of conduit I to extend as high as possible above the free surface of the liquid, I provide a dome-shaped extension 4 of the tank upper wall, if enough space is available.

As for the feeder tube 5, it should comply with the following conditions:

This tube, as shown, is rigid, although without departing from the invention, it may be either rigid or at least partly flexible so as to facilitate its introduction into conduit I.

The tube is provided with means capable of bringing and keeping it in a suitable position for obtaining a correct positioning of the outlet of said tube at the top of conduit I.

In the embodiment of my invention illustrated by the drawings, said means consist of a nose 6 carried by the top end of the feeder tube 5, which permits hooking the feeder tube to the free upper edge 7 of conduit 4 and, at the same time, of correctly directing the jet of liquid toward the inside of the tank.

In order to supply the feeder tube with liquid, from the source of liquid which is available, I may have recourse to all suitable connecting means, the nature of said connecting means depending merely upon that of the source.

In a fuel reservoir equipped with a pump, it will suffice to utilise the usual means which connect the feeder tube with said pump, including a flexible tube.

In other cases, I may, for instance make use of a system of auxiliary pump which can be devised in any suitable manner, including, in particular, an intermediate vessel 8, provided with a plunger tube 9, said vessel being provided with an air pump 10 so as to permit of forcing the liquid upwardly through a flexible tube 11 toward the feeder tube 5 or the cock or the like 12, as shown in Fig. 1.

Fig. 2 shows an alternative arrangement for supplying liquid wherein the elements similar to those described in the Fig. 1 structure are designated by prime numerals. These elements include the wing A', tank R', conduit I', coupling piece 2', plug 3', dome 4', feeder tube 5', nose 6', upper edge 7', tube 11' and cock 12'. However, instead of the auxiliary pump arrangement, a funnel-shaped vessel 13 at the end of tube 11' is supported at a suitable level for the filling operation.

Preferably, according to the present invention, I combine with the system such as above described, warning means for indicating the end of the filling operation, which means may be of a mechanical, electrical, pneumatic, or any other type.

In the drawings, I have shown such a warning device which is of the mechanical type and includes, for instance, a rod 14 or 14' combined with a float 15 or 15', said rod being adapted to project outwardly from the orifice 2 or 2' when the level of the liquid in the tank has reached its upper limit.

Whatever be the embodiment that is finally chosen, I obtain a system the operation of which is sufficiently obvious so that further illustration is unnecessary.

The system according to the present invention has, over the other systems used for the same purpose up to the present time, the following advantages, among many others:

It avoids in a certain manner the presence of fuel liquid on the inside of the wing.

On the other hand, it simplifies, in a general manner, the filling of the tanks of aircraft or the like since the filling orifice is located at a level substantially much lower and therefore easier to reach, from the ground.

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the appended claims.

What I claim is:

1. In a system including an airplane wing, and a tank located inside said wing, a device for filling said tank which comprises, in combination, a conduit having its lower end fitted in a fluid-tight manner in the under side of said wing and extending upwardly so as to open into said tank at the upper part thereof above the highest liquid level in said tank, a removable feeder tube extending through the said conduit for the flow of fuel to said tank, and means for normally closing the lower end of said conduit when the feeder tube is removed, said means lying flush with the under side of said wing.

2. In a system including an airplane wing and a tank located inside said wing, a device for filling said tank which comprises, in combination, a conduit having its lower end fitted in a fluid-tight manner in the under side of said wing and extending upwardly so as to extend through said tank and to open at the upper part thereof above the highest liquid level therein when said tank is normally full, means in said tank above the highest liquid level thereof for accommodating the upper end of a filler tube extending upwardly through the conduit to a filling position, and means lying substantially flush with the lower surface of said wing for normally closing the lower end of said conduit.

3. In a system including an airplane wing, a tank located inside said wing, one portion of the top of said tank being higher than the remainder thereof, a device for filling said tank which comprises, in combination, a conduit having its lower end fitted in the under side of said wing and extending upwardly through said tank so as to have its upper end located at the upper part of said tank above the highest liquid level therein, a readily removable feeder tube extending through said conduit and into said higher portion of said tube for supplying fuel to said tank, and means for normally closing the lower end of said conduit when the tube is removed.

4. In a system including an airplane wing and a tank located inside said wing, a device for filling said tank which comprises, in combination, a vertical straight conduit having its lower end fitted in a fluid-tight manner in the under side of said wing and extending upwardly through said tank above the highest liquid level therein, a dome-shaped extension of said tank at the top thereof adapted to accommodate the top end of said conduit, a removable feeder tube extending through said conduit for supplying fuel to said tank, said feeder tube having an overhanging upper end for engagement with the upper end of said conduit, and means for normally closing the lower end of said conduit when said tube is removed.

5. In a system including an airplane wing and a tank located inside said wing, a device for filling said tank which comprises, in combination, a conduit having its lower end fitted in a fluid-tight manner in the under side of said wing and extending upwardly through said tank so as to have its upper end located at the top of said tank above the highest liquid level therein, a feeder tube extending through said conduit for supplying fuel to said tank, means for holding and positioning said feeder tube in proper relation to said conduit, means for disconnecting said filler tube, and means for closing said conduit when said tube is disconnected.

6. In a system including an airplane wing and a tank located inside said wing, a device for filling said tank which comprises, in combination, a vertical straight conduit having its lower end fitted in a fluid-tight manner in the under side of said wing and extending upwardly so as to have its upper end located at the upper part of said tank above the highest liquid level therein, a feeder tube connected with a source of fluid supply and extending through said conduit for supplying fuel to said tank, said feeder tube being bent at the top so as to hook on the upper edge of said conduit whereby said tube is positioned and held in proper relation to said conduit, means for bodily disconnecting said feeder tube, and means for closing said conduit when said tube is disconnected.

7. In a system including an airplane wing and a tank located inside said wing, a device for filling said tank which comprises, in combination, a vertical straight conduit having its lower end fitted in a fluid-tight manner in the under side of said wing and extending upwardly through said tank so as to have its upper end located at the top of said tank above the highest liquid level therein, a readily removable feeder tube extending through said conduit for supplying fuel to said tank, means for holding and positioning said tube in proper relation to said conduit, means for closing the lower end of said conduit when said tube is removed, and means adjacent the lower end of said conduit for indicating the maximum filling of said tank.

8. In a system including an airplane wing and a tank located inside said wing, a device for filling said tank which comprises, in combination, a vertical straight conduit having its lower end fitted in a fluid-tight manner in the under side of said wing and extending upwardly through said tank so as to have its upper end located at the top of said tank above the highest liquid level therein, a feeder tube extending through said conduit for supplying fuel to said tank, means adjacent the lower end of said conduit for indicating the maximum filling of said tank, and closure means for closing the lower end of said conduit, said indicating means being covered by said closure means when in closing position.

9. In a system including an airplane wing and a tank located inside said wing, a device for filling said tank which comprises, in combination, a conduit having its lower end fitted in a fluid-tight manner in the under side of said wing and extending upwardly through said tank so as to have its upper end located at the upper part of said tank above the highest liquid level in said tank, a feeder tube extending through said conduit for supplying fuel to said tank, means holding and positioning said feeder tube in proper relation to said conduit, a float mounted at the upper part of said conduit, means operative by said float and adapted to project from the under side of said wing for indicating when the liquid reaches its maximum level in said tank, means to bodily disconnect said feeder tube, and means to close said conduit when said tube is disconnected.

10. A device for filling a tank which comprises, in combination, a conduit having its lower end fitted in a fluid-tight manner through the under side of said tank and extending upwardly so as to open into said tank at the upper part thereof above the highest liquid level therein, a feeder tube, extending up through said conduit for delivering fuel over the top of said conduit into said tank and detachably connecting said tank to a source of fluid supply, and means for normally closing the lower end of said conduit when said tube is detached.

11. In a system including a closed outer casing and a tank located inside said casing, a device for filling said tank which comprises, in combination, a conduit having its lower end fitted in a fluid-tight manner in the lower side of said casing and extending upwardly in an uninterrupted manner through the bottom of said tank and opening into said tank at the upper part thereof above the highest liquid level in said tank, a readily removable feeder tube extending upwardly through said conduit so as to discharge fuel over the top of said conduit into said tank, and means for closing said conduit after said tube has been removed.

12. In a system including an airplane wing and a tank located inside said wing, a device for filling said tank which comprises, in combination, an overflow conduit having its lower end fitted in a fluid-tight manner at the outside of said wing and extending upwardly so as to open into said tank at the upper part thereof above the highest normal liquid level in said tank, a readily removable feeder tube extending from the outside of said wing through said overflow conduit for discharging fuel over the top of said overflow conduit into said tank, means on the upper end of said feeder tube normally directing the flow issuing therefrom to the side of said overflow conduit, and means for closing said overflow conduit when said feeder tube is removed.

13. A device according to claim 10 in which the feeder tube has an outer diameter smaller than the inner diameter of said conduit so as to leave clearance space between said tube and said conduit.

FÉLIX AMIOT.